United States Patent [19]

Bracht et al.

[11] Patent Number: 4,882,721

[45] Date of Patent: Nov. 21, 1989

[54] OFFSET FOR PROTECTION AGAINST AMORPHOUS PIPS

[75] Inventors: Roger R. Bracht, Colorado Springs, Colo.; Johannes J. Verboom, Bergeyk, Netherlands

[73] Assignee: Laser Magnetic Storage International Company, Colorado Springs, Colo.

[21] Appl. No.: 163,156

[22] Filed: Feb. 24, 1988

Related U.S. Application Data

[63] Continuation of Ser. No. 578,150, Feb. 8, 1984, abandoned, and a continuation of Ser. No. 897,681, Aug. 18, 1986, abandoned.

[51] Int. Cl.$^4$ .............................................. G11B 27/36
[52] U.S. Cl. ...................................................... 369/54
[58] Field of Search ..................... 365/113; 369/53–58, 369/116

[56] References Cited

U.S. PATENT DOCUMENTS

| | | | |
|---|---|---|---|
| 3,868,651 | 2/1975 | Oushinsky | 365/113 |
| 4,145,758 | 3/1979 | Drexler et al. | 369/54 |
| 4,150,402 | 4/1979 | Tietze et al. | 369/116 |
| 4,198,701 | 4/1980 | Reddersen et al. | 365/127 |
| 4,308,612 | 12/1981 | Miyauchi et al. | 369/38 |
| 4,355,318 | 10/1982 | Miyauchi | 369/54 |
| 4,464,714 | 8/1984 | Huijser et al. | 364/200 |
| 4,488,277 | 12/1984 | McFarlane et al. | 369/54 |
| 4,523,304 | 6/1985 | Satoh et al. | 369/32 |
| 4,535,439 | 8/1985 | Satoh et al. | 369/275 |
| 4,546,462 | 11/1985 | Koishi et al. | 369/53 |
| 4,719,612 | 1/1988 | Kenjyo | 369/54 |

FOREIGN PATENT DOCUMENTS

| | | |
|---|---|---|
| 0023783 | 2/1981 | European Pat. Off. . |
| 0077075 | 4/1983 | European Pat. Off. . |
| 0081757 | 6/1983 | European Pat. Off. . |

*Primary Examiner*—Robert L. Richardson
*Assistant Examiner*—James E. Tomassini
*Attorney, Agent, or Firm*—Sheridan, Ross & McIntosh

[57] ABSTRACT

Provided is a read signal offset during write verify which prevents the false detection of amorphous pips from an optical disk recorder. Amorphous pips are the signals caused by the drop in reflection from an optical disk after the laser has caused the surface material to change from its crystalline state to an amorphous state, but not to a hole. When a hole is not formed in the material, the amorphous material later recrystallizes, the drop in reflection no longer occurs and information is lost.

6 Claims, 5 Drawing Sheets

OFFSET FOR PROTECTION AGAINST AMORPHOUS PIPS

This is a continuation of co-pending application Ser. No. 578,150, filed on Feb. 2, 1984, now abandoned. This is also a continuation of co-pending application Ser. No. 897,681, filed on Aug. 18, 1986, now abandoned.

BACKGROUND OF THE INVENTION

1. Field of the Invention

The invention relates to the field of optical disk recorders and, more particularly, to means for verifying the proper writing of data on the optical disk.

2. Brief Description of the Prior Art

Write verify apparatus for verifying the correct writing of data on optical media immediately after writing does so by detecting the pip, which is caused by a drop in reflection due the hole just formed when the laser writing the hole is returned to read power. All current recording materials have a crystalline form which is reflective. When the laser impinges in the material, it undergoes a transformation to an amorphous state and then melts. When it melts, surface tension causes the formation of a hole in the media which is not reflective. These holes comprise information which can be read by the optical system by detecting the loss in reflection they cause.

Occasionally, write verify systems detect the presence of a "correctly" recorded hole due to the presence of a pip only to have the "hole" later disappear during reading.

SUMMARY OF THE INVENTION

The reason for this disappearing hole has been discovered. It sometimes happens that the laser energy input is insufficient to complete the process of melting and hole formation, and the media remains in its amorphous state. In the amorphous state, there is a drop in reflectivity which may be detected by a write verify system detecting a pip. Later, the media recrystallizes. The "hole" then disappears. The invention overcomes the problem of the amorphous pip by injecting an offset into the read detection and amplification electronics during write verify at the occurrence of a write pulse. The offset is approximately the same signal strength as that of an amorphous pip, but inverted therefrom.

DESCRIPTION OF THE PREFERRED EMBODIMENT

The read signal offset for protection against amorphous pips is intended to be used in conjunction with a differential write verify system in the preferred embodiment. In this regard, the write verification system will first be described. The modification to it to inject the offset on the read signal will be described next.

An optical recorder reading the information from an optical disk does so conventionally by means of a laser operated at read power. The beam reflects from the disk, and the drop in reflection normally indicates the presence of a hole. Because reflected spot density distributions have a Gaussian shape, the hole associated power of the reflected beam (the hole associated power means the inverse of the reflected power from the disk) spreads a significant distance beyond the boundaries of the holes themselves. Indeed, the hole power present at the center of the next possible position of a hole in closely spaced systems may be significant. For this reason, differential detection is used to detect the location of the pips from the newly written holes in the preferred embodiment.

Figure 1:
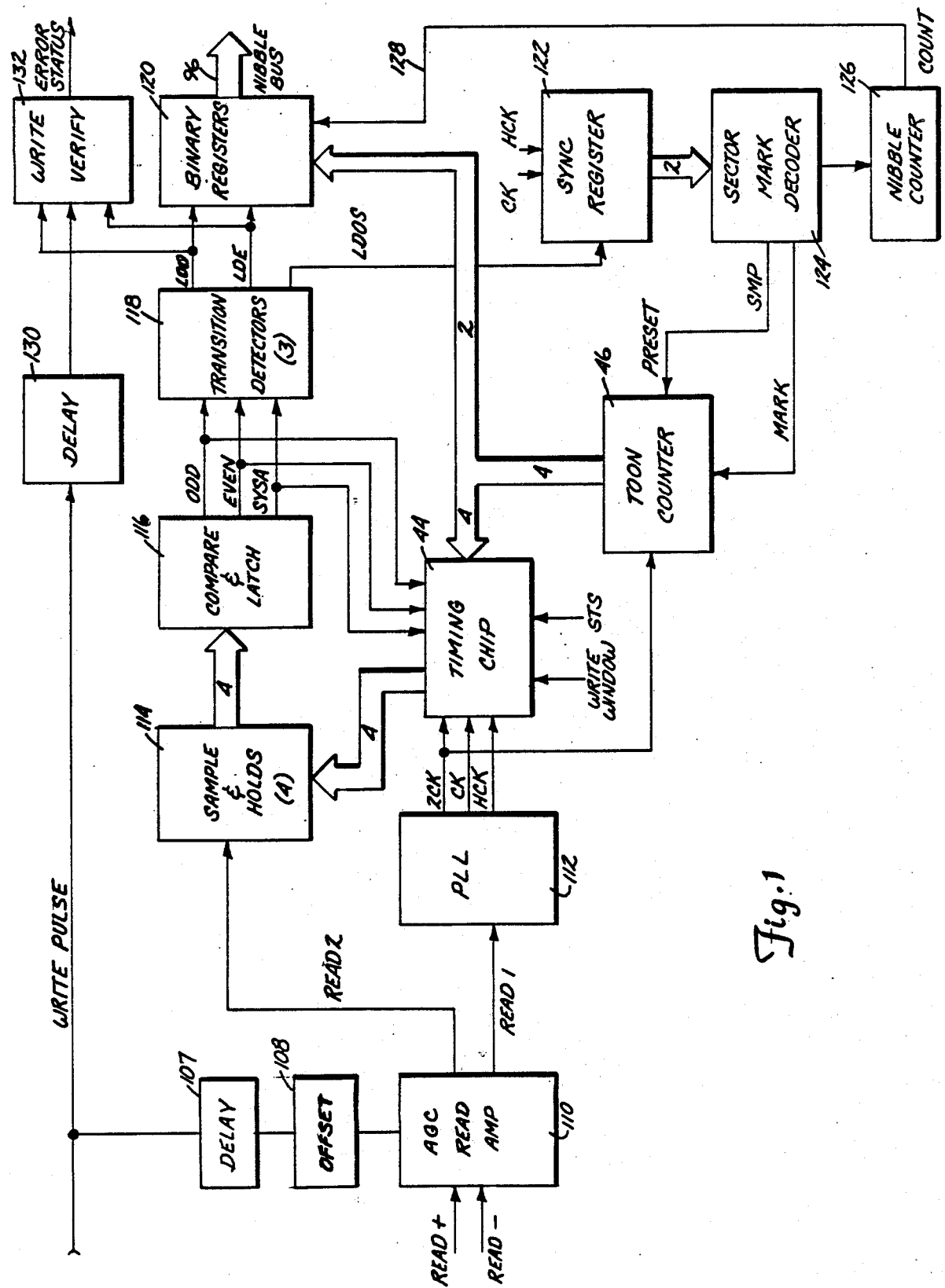
FIG. 1 shows a block diagram of the read channel of the optical recording system of the preferred embodiment.

FIG. 1 shows a block diagram of the read channel of the optical recording system according to the preferred embodiment. The pre-amplified signal from the read detector (not shown) is input to the AGC 110 shown in FIG. 1, which outputs the amplified and limited signal on Read 1 and Read 2 outputs When the optical system writes a hole in the media, it issues a write pulse, and a signal indicative of the write pulse is input to a delay 130, which will be discussed below, and a voltage offset means 108, which causes the AGC and read amlifier 110 to offset its Read 2 output by a predetermined voltage. This predetermined voltage is approximately the voltage caused by an amorphous pip as detected by the write verify system, but inverted therefrom. The Read 1 output is input to a phase lock loop 112 which tracks a prerecorded clock inscribed in the optical disk, or if the code is self-clocking, the clock information present in the code. The phase lock loop outputs several clock signals, the most important of which is a 2CK clock at a frequency twice that of the prerecorded clock of the preferred embodiment. This 2CK is input to a Timing Chip 44 and to a TOON counter 46 TOON is the name of the fixed block code of the preferred embodiment. The Toon counter's essential purpose is to count the number of symbol positions to generate a symbol position address. The function of the Timing Chip 44 will be discussed infra.

The Read 2 signal is input to four gated sample and hold cells 114, two each for the respective even and odd symbol positions of the TOON code. The sampling of the cells is controlled by Timing Chip 44. The outputs of the cells are input to two comparators 116 an even and an odd comparator respectively, which determine which of the two has the highest hole associated signal power. The comparator outputs are first latched and then fed back to Timing Chip 44 and to a transition detector circuit 118. The transition detectors detect a change in the state of the comparators 116 outputs and signals that change to several locations: (1) to a pair of binary registers 120, (2) to write verify appparatus 132 and (3) to a sync register which forms part of a sector dark decoder circuitry. The outputs to the binary registers and to the write verify registers are differentiated between the even and the odd symbol positions.

For the reading of data, the apparatus converts the "address" of the change in the state of the comparators into binary. The address of the change as represented by the count on the TOON Counter 46. This count is recorded by binary registers 120 and later becomes the binary value of the symbol. Each symbol of the TOON code encodes four bits. After two symbols have been recorded in the registers 120, the optical disk recorder reads the eight binary bits of data just decoded out of the registers along a data bus 196.

The system also used for the detection of sector marks. An LDOS signal indicative of a change in one of the comparators is supplied to a sync register 122 which, in combination with sector mark decoder 124, decodes the presence of sector marks an initializes the TOON counter 46 and a nibble counter 126 The nibble counter 126 counts up by one each symbol until the next sector mark. The lowest order bit of this nibble counter, nibble count 0, is output on output 128 and is used by the binary registers 120 to signal the lapse of two symbols. The write verify apparatus 132 will be described below.

The present invention pertains an optical recording system writing data on the optical disk in fixed-block format wherein binary data is encoded into a symbol having a predetermined number of positions in which a predetermined number of holes are recorded. The preferred embodiment uses a so-called TOON code which has eight positions in which holes may be written and one position in which no holes are written. The latter position is normally reserved at the end of the symbol. The TOON code is further constrained to have one hole written at an even position and one hole written at an odd position. Only two holes are written in the symbol.

Figure 2:
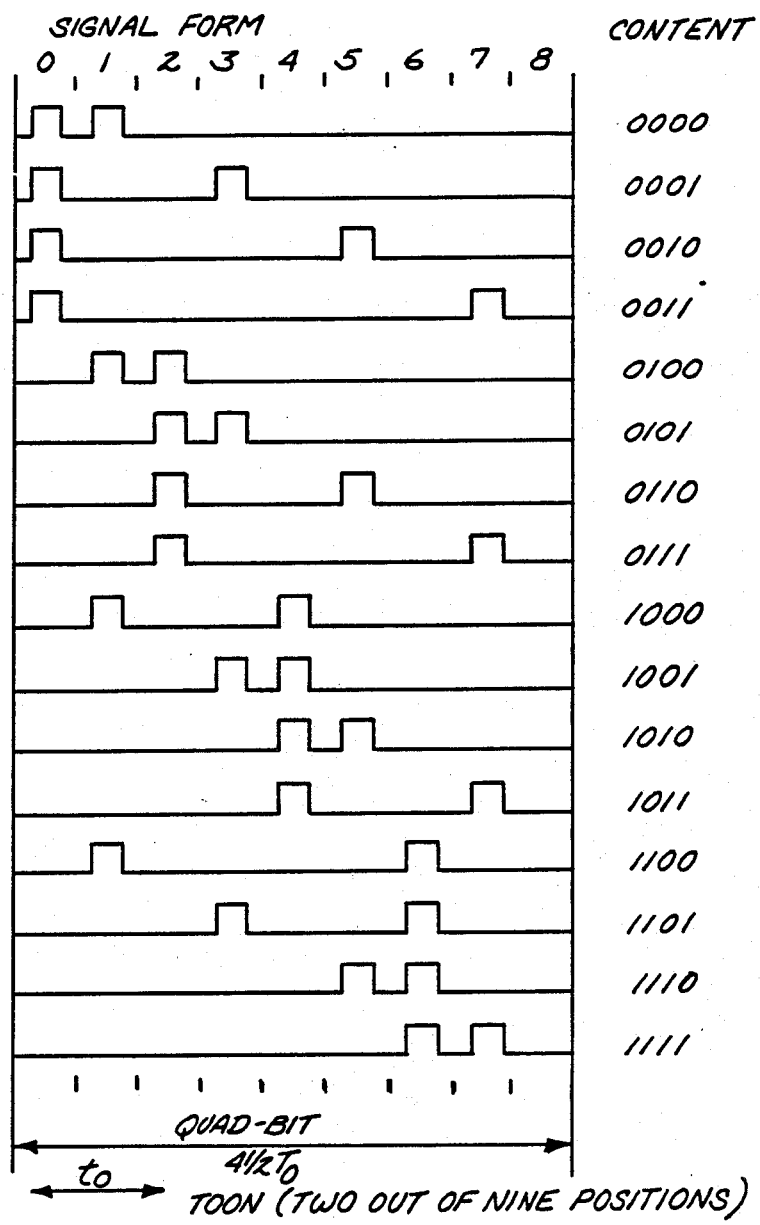
FIG. 2 shows the TOON code and it corresponding binary equivalent.

FIG. 2 shows the TOON code. It has nine positions numbered in the Figure from zero to eight. The eighth position is the one constrained to never have a hole recorded in it. The other eight positions have one hole in an even position and one hole in an odd position. The code is shown in the Figure and the corresponding binary bit values are shown in the table to the right. Each symbol of the TOON code encodes four bits of information.

Figure 3:
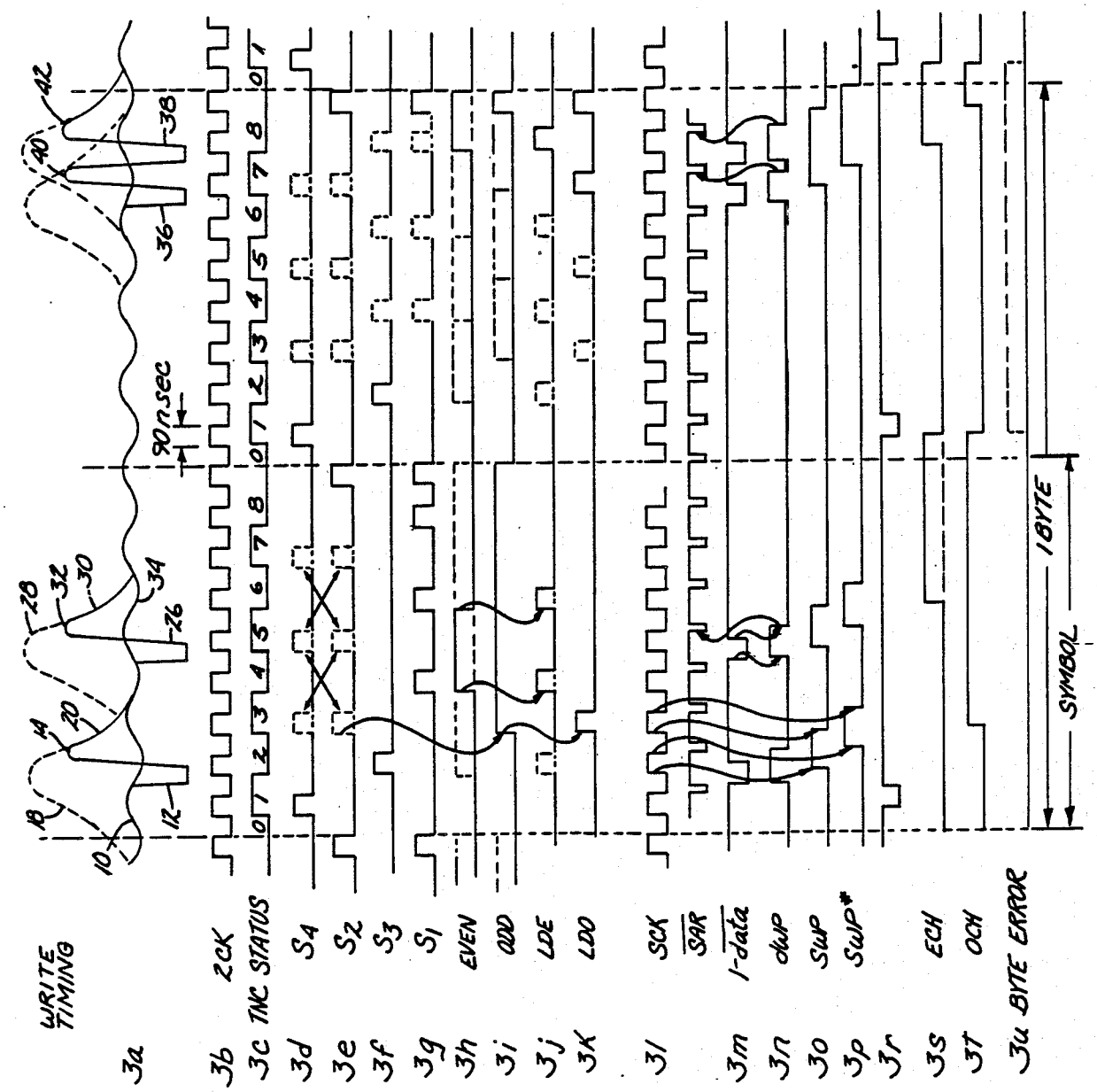
FIGS. 3a-3f and 3r-3u shows a timing diagram of various signals and pulses of the apparatus of the present invention over two symbols and showing the signal levels associated with two possible hole patterns.

The code is recorded on the media in such a manner that four and one half clock periods, To, span the symbol. Referring to FIG. 3a, the clock is illustrated as the sinusoidal line 10. It is from this signal that the phase lock loop generates the 2CK signal shown in FIG. 3b.

The fall of 2CK denotes the beginning of a symbol position and the rise of 2CK denotes the center of a symbol position. There are exactly nine 2CK clocks in a symbol. In the preferred embodiment, the phase lock loop adjusts the phase of 2CK such that the signal SCK, discussed infra, which is derived from 2CK but delayed therefrom by a matter of 20 to 30 nanoseconds, is in phase with the prerecorded clock such that SCK's positive transitions occur at the center of a symbol position. With this in mind, further discussion of symbol positions will be in reference to 2CK.

FIG. 3c corresponds to the TNC0 bit out of the TOON Counter 46. It undergoes eight transitions during a symbol and the transitions occur at the center of a given symbol position. The numbers in the Figure correspond to the number of the symbol position in which the next transition occurs. There is no transition in ninth symbol position, number 8, primarily because no hole will ever be recognized in this position even if a hole is somehow recorded therein.

Holes are preferably written at the center of a symbol position. To write a hole, the optical recording device generates a write pulse from a laser beam of approximately 60 nanoseconds in length. The symbol position length or the length of time for a symbol position to pass past a fixed location at typical operating speeds of the optical recording system of the preferred embodiment is 180 nanoseconds. The hole burned into the optical recording medium by such a write pulse is typically much larger than 60 nanoseconds in length and may be larger than the 180 nanoseconds length of a symbol position. After the laser beam has been pulsed at write power the optical recording system of the preferred embodiment returns it to a read power level used conventionally to read the prerecorded clock on the optical recording surface. The laser beam continues to be focused for a short period of time on the hole just burned in the optical recording medium. The loss of reflectivity caused by the hole can be detected by the read detectors employed in the read apparatus of a conventional optical disk recorder system.

FIG. 3a shows the inverse of the power of the reflected laser beam for two typical symbols on the optical recording medium The drop in reflection caused by the presence of a hole is shown as a positive signal, while the rise in reflection due to a write pulse is indicated by a negative signal. The vertical dashed lines in the Figure represent the boundaries at the edges of the symbols.

Again referring to FIG. 3a, the optical recording apparatus is shown writing a hole at the center of symbol positions numbers 1 and 4 of the first symbol. In this regard, the write pulse occurs 30 nanoseconds before the rising edge of the SCK and is designed to reach its peak power precisely at at the center of symbol position number 1, approximately at the rising edge of the SCK 30 nanoseconds later the write pulse is turned off. The write pulse in the Figure is denoted by the negative going waveform 12 and also by the 1-data NOT signal at FIG. 3m.

After the write pulse has been terminated and the laser beam restored to its "read" power the laser beam will remain over a portion of the hole just formed in the optical recording medium, assuming, of course, a hole was in fact formed by the write pulse. In this regard, the hole does not reflect the laser beam and the inverse of the signal detected by apparatus detecting the reflected beam will generate a high signal at 14 in the Figure. This is a so-called pip. The solid line 20 in the Figure represents the actual signal, corresponding to the hole associated signal power. During a normal read where the apparatus reads the hole from edge to edge, the hole associated signal would appear as in the dotted line 18 and would peak at a peak 16 which is of greater amplitude than peak 14 of the read after write signal 20. As can be seen by inspection of the Figure, the hole associated power 20 of a hole written at symbol position 1 will be present to a significant degree at symbol position 2.

The second negative going pulse in FIG. 3a represents a second hole being written in the symbol at the center of symbol position 4. Here again, the dotted line 28 represents the hole associated signal power which would have been received by the read system were it to detect the hole under normal reading conditions. However, as the laser beam detects the hole at least 30 nanoseconds after the center of the hole has passed, the signal strength is again detected at a peak 32 somewhat less than it would have been under normal read conditions.

Assuming a defect in the media or perhaps a defect in the writing system, a hole may not be formed for in the media. When the write pulse is turned off, the hole associated power of the read signal will then not follow line 30 but will instead follow the line 34 which corresponds to the signal of the prerecorded clock. The subject of amorphous pips will be discussed infra.

The second symbol shows holes 40, 42 being written by write pulses 36 and 38 at symbol positions 6 and 7.

Figure 4:
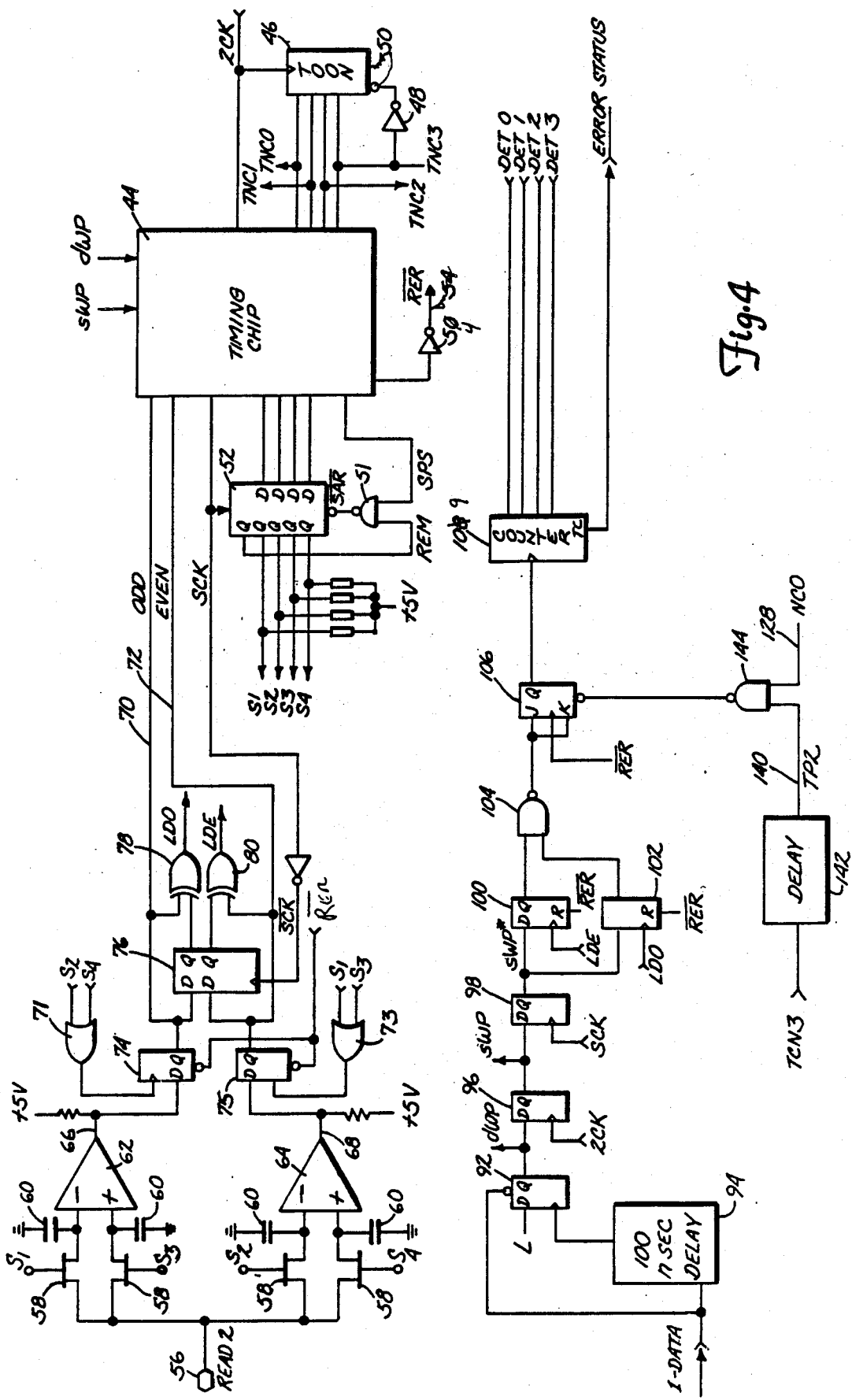
FIG. 4 shows a schematic of the present invention showing the apparatus which detects by comparison the location of the odd and the even symbol positions having the highest hole associated signal levels and which compares the locations of the write pulse signals with the locations of the detected holes.

FIG. 4 shows apparatus first for detection of the location of a hole and secondly for comparing the location of the detected hole with the actual location of the write pulse. Referring to the top right-most part of FIG. 4, the 2CK clock derived from the phase lock loop 112 is provided as an input to both a Timing Chip 44 and a TOON counter 46. TOON counter 46 counts once for each cycle of the 2CK with its four-bit count on outputs TNC0, TNC1, TNC2, and TNC3, respectively. A count of 8, TNC3, resets the counter to zero due to the inverter 48 feeding TNC3 back into master reset not 50 of the TOON counter 46.

The Timing Chip 44 also outputs an RER signal, which is inverted by inverter 54, to become an RER NOT signal. The signal RER is output once per symbol during the last half period of symbol position. The purpose of RER is to signal the end of a symbol to various registers as will be discussed infra, and also to reset other registers.

Figure 5:
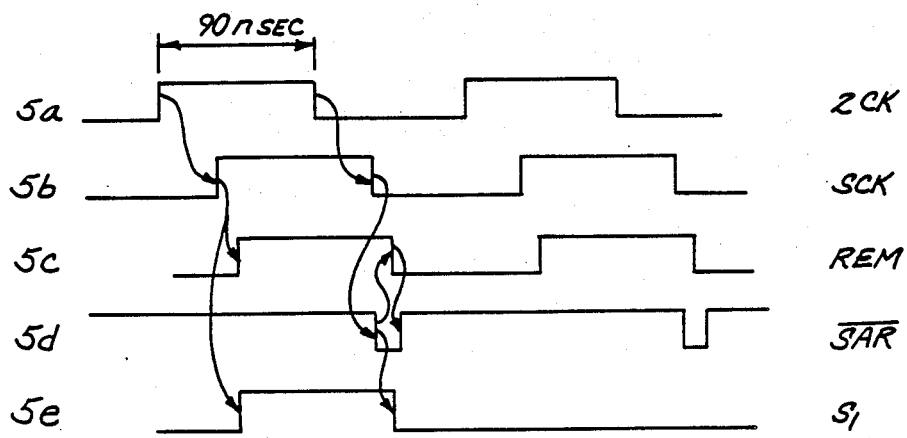
FIGS. 5a to 5e shows the relative time spacing between a number of clocks and other symbols employed by the preferred apparatus.

As can be seen from FIG. 3l, the Timing Chip outputs an S-clock ("SCK") which corresponds directly with the 2CK signal. SCK is delayed from 2CK by approximately 22.5 nanoseconds as can be seen from FIG. 5.

The Timing Chip 44 also outputs through register 52 signals S1, S2, S3 and S4 and an REM signal. Signals S1–S4 and REM are set by the rising edge of SCK clocking register 52 Signal SAR NOT resets register 52 and signals S1 through S4 and REM. SAR NOT is normally triggered at the falling edge of SCK, see FIG. 5 where it can be seen that at the fall of the SCK signal, which occurs 22.5 nanoseconds after the fall of the 2CK signal, causes the Timing Chip 44 to output an SPS signal, which when coupled with REM in NAND gate 51, generates the SAR NOT signal (see FIG. 5d) which resets register 52 and thereby resets signal S1 through S4 and REM as can be seen from FIG. 5e, which shows the resetting of the S1 signal. The resetting of REM also resets SAR NOT. Thus, the S1 signal is normally "on" for a period of approximately 90 nanoseconds from a point approximately 30 nanoseconds after the rise of the 2CK signal to approximately 30 nanoseconds after its fall.

Referring to the upper left-most of FIG. 4, the signals S1 to S4 control corresponding FET 58 gates between the Read 2 input 56 and respective grounded capacitors 60. The combination of a gate and a capacitor forms a sample and hold cell as is known to the art, and the respective sample and hold cells will henceforth be referred to by the respective signals controlling their gates, S1, S2, S3 and S4. The signal input on Read 2 line 56 corresponds to the hole associated power of the reflected laser beam as discussed above. Each of the capacitors 60 is also connected two each to respective comparators 62 and 64. Comparator 62 operates on the even positions of a TOON symbol and comparator 64 operates on the odd positions. Comparator 62 compares the signal value on the S1 sample hold with the signal value then present on the S3 sample and hold, while the comparator 64 compares the signal value in the S2 sample hold with signal value on the S4 sample and hold. The comparators output the results of the comparison on outputs 66 and 68, respectively. These outputs are latched by flip flops 74 and 75, the outputs of which are provided as respective inputs 70 and 72 to the Timing Chip 44.

The write beam is synchronized to write for 60 nanoseconds centered on the zero crossing of the prerecorded clock, the center of a symbol position. S1 through S4 go high about 30 nanoseconds after the rise of 2CK, just about the center of the symbol position. When a write pulse has just occurred, Timing Chip 44 synchronizes the issuance of the SAR NOT signal to the write pulse by responding to the sWP and dWP signals. These two signals, sWP and dWP, are the outputs of registers 96 and 92, which will be discussed in more detail infra, but their function is essentially to generate a delay signal responsive to the write pulse. The purpose of this delay is to delay the turning off of the signals S1 through S4 until the peak of the hole associated signal is sampled. This generally occurs a measurable time after the occurrence of the write pulse, and will be a predetermined time. Signals sWP and dWP are provided as inputs to Timing Chip 44. Their timing in relation to a write pulse are shown in FIGS. 3m through 3o. The write pulse corresponds to the 1-data NOT pulse, FIG. 3m.

Referring again to FIG. 4, the Timing Chip 44 initially turns S1 and S2 on during the last half-period of symbol position 8 of ever symbol position see FIGS. 3e and 3r. Because symbol position 8 is the symbol position in which no hole is ever written, this sampling is intended to initialize these sample and hold cells to a reference value. An alternative method of initialization would be to include circuitry to initialize these sample and holds from a fixed reference equivalent to the average signal strength of the no-hole condition.

During the first symbol position of the immediately following symbol, symbol position 0, and even position, sample and hold cell S4 is turned on to sample the signal at the first even cell. During the first odd position, position number 1, sample and hold S3 is turned on to sample the signal at the first odd cell. The signals present on the Read 2 line 56 during these symbol positions are copied into the corresponding capacitors 60 of the sample and hold cells and compared with the signal in the S1 and S2 sample and hold cells, which contain the reference level. If for example, the results of the comparison indicate that S1 sample and hold value exceeds the S3 sample and hold value, the output 66 of the comparator 62 will be low. Output 68 will be low if S2 exceeds S4. The Timing Chip 44 then saves the higher of the two values, S1 (S2). It does this at the next occurrence of an odd (or even) cell by triggering the S3 (S4) sample and hold, which then holds the lowest valued signal of the two. If again the S1 (S2) sample and hold contains the highest value, at the next occurrence of an odd (even) symbol position, the S3 (S4) sample and hold is again triggered. This process continues throughout the symbol with the highest valued sample and hold cell retained and compared with the next sampled value. At the end of the symbol, one of the sample and holds of each comparator will contain the highest valued signal, and this signal corresponds to the hole within the symbol, if there is a hole recorded there.

Referring to the example shown in FIG. 3a, when the S3 sample and hold cell is triggered at position 1 in the first symbol, it samples the signal caused by the hole just written. The sample and hold samples a read signal at approximately the level indicated at point 14 on FIG. 3a. As can be seen by inspection of FIG. 3a, the signal level at this point 14 is higher than the signal sampled by the S1 sample and hold at the previous symbol position 8. The signal in the S3 sample and hold is higher than the signal on the S1 sample and hold and is retained. At the next occurrence of an odd symbol at symbol position 5, the Timing Chip 44 determines that S3 now contains the highest signal and triggers the S1 sample and hold. By inspection of FIG. 3a, it can be seen that the signal level at this point 30 is higher than the reference signal level but lower than the peak value 14 of the signal at position 1. Thus, S3 continues to contain the higher of the two values. Timing Chip 44 triggers S1 at the last odd position, position number 7. This value is again less than the value in sample and hold cell S3. (The sequence of triggering of S1 and S3 just described is shown at FIGS. 3f and 3g.)

If at any time the two signal levels present in the respective sample and holds are about equal, which may occur when the holes are recorded later in the symbol, the state of the comparators 62 or 64 is indeterminate. Either one of the two is retained for the next symbol. This feature is illustrated by the dashed lines shown in FIGS. 3d and 3e which show the triggering of the S2 and S4 sample and hold cells.

Timing Chip 44 recognizes the finding of a new higher valued signal by the change in the outputs of the latched comparators 62 or 64, which are connected to Timing Chip 44 via flip flops 74 and 75 on lines 70 and 72. FIGS. 3h and 3i, which show the state of the outputs of the even and odd flip flops 74 and 75, respectively.

The outputs of the 62 and 64 are provided as inputs to respective flip-flops 74 and 75, whose outputs are in turn provided to flip-flop 76 and as one input to exclusive-OR gates 78 and 80. The outputs of register 76 are provided as the other inputs to exclusive-OR gate 80. Registers 74 and 75 are clocked by OR gates 71 and 73 respectively, which form the logical OR of the signals S2 and S4, and S1 and S3 respectively. This method of clocking these flip-flop assures that the outputs of the comparators are sampled after the comparators have changed by sampling an even position at the next odd position and an odd position at the next even position. Further the state of the flip flops remains steady for a predetermined clock period. Register 76 is clocked by the inversion of SCK approximately 90 nanoseconds after the clocking of flip-flop 74. The exclusive-OR gates 78 and 80 compare the outputs of the comparator 62 and 64 from one symbol position to another and generate a pulse of approximately 90 nanoseconds duration if the outputs change. Exclusive-OR gate 78 is indirectly connected to the output 66 of comparator 62. FIG. 3j shows the pulse LDO out of exclusive-OR gate 78 indicative of the changes in the relative signal levels in the S1 and S3 sample and holds discussed heretofore. Exclusive-OR gate 80 is indirectly connected to the output 68 of the comparator 64 FIG. 3k shows the pulse out of exclusive-OR gate 80 indicative of the changes in the relative signal level of sample and hold cells S2 and S4 discussed above. The load odd and load even pulses LDO and LDE occur when a new "higher" signal level has been recognized by the respective comparators.

A 1-data NOT signal which the optical recording system uses to issue a write pulse is provided as an input to the SET NOT input of a flip flop 92 and also to variable delay circuit 94 The delay of the circuit 94 is adjustable to a maximum delay of 100 nanoseconds so that the circuits of the preferred embodiment can be fine tuned to a particular machine. The delay not only adjusts the setting of the turn-off time of S1 through S4, but also the timing in relation to the LDO and LDE pulses. An 1-data NOT pulse sets flip flop 92 and a pulse from the 100 nanosecond variable delay circuit 94 resets the flip flop 92 as the D input is latched low. The output of this flip flop is the dWP signal shown in FIG. 3n and is provided both to Timing Chip 44 and to a flip flop 96. Flip flop 96 is clocked by the 2CK signal so that the rising edge of 2CK sets the flip flop and the next rising edge resets it. The output of this flip flop 96 is the sWP signal shown in FIG. 2o and is provided to both Timing Chip 44 and to a flip flop 98. Flip flop 98 is clocked by the inverted SCK clock such that the fall of SCK set the flip flop and the next fall resets. The signal out of this flip flop is the sWP* signal shown at FIG. 3p. From inspection of the Figure, it can be seen that sWP* is delayed about 120 nanoseconds from sWP. The output of this flip flop 98 is provided as an input to flip flops 100 and 102. These are clocked respectively by the LDE signal and the LDO signal. The delays of the 100 nanosecond delay 94 and flip flops 96 and 98 delay the write pulse from reaching flip flops 100 and 102 until a time corresponding to the "90" nanosecond sampling time of S1 through S4 signals, the delays through the comparator 62, delays through the flip flops 74 and 75 and register 76, and the delays through exclusive OR gates 78 and 80.

If a hole has been properly written onto the optical recording surface, a write pulse will be present at the D input to flip flop 100 at the occurrence of the last load even and load odd pulses, LDE and LDO respectively. If, and only if, there is a correspondence between the last occurrence of an LDE signal and an LDO signal and respective write pulses in the even and odd positions will the outputs of the flip flops 100 and 102 be simultaneously at a logical one state. The output of flip flop 100 is shown at FIG. 3s and the output of flip flop 102 is show at FIG. 3t. If the second write pulse of the first symbol did not write a pulse correctly or if a media defect caused a high level at another even position, flip flop 100 will remain off and this is shown in FIG. 3s by the dashed lines. This same analysis pertains to LDO and flip flop 102.

The outputs of these flip flops 100 and 102 are input to a NAND gate 104. The output of NAND. gate 104 is low if, and only if, flip flops 100 and 102 have recorded the simultaneous occurrence of write pulses and load even and load odd signals.

A nibble count 0 (128) issued by the nibble counter 126 and a TP2 pulse 140, which comprises a delayed TNC3 pulse from delay 142, are inputs to a NAND gate 144, the output of which resets a JK flip flop 106. Nibble count 0 occurs every other symbol, and TP2 occurs at symbol position count 2. After the end of a symbol, the Timing Chip 44 outputs an RER NOT signal which clocks JK flip flop 106. The RER NOT signal is shown at FIG. 3r. If the state of the inputs to the JK input are zero, the Q output of the JK flip flop 106 remains unchanged. Thus, during the time of two symbols comprising a byte of data with correctly written holes, the output of the flip flop 106 will remain 0. However, if either one of the two symbols between the resetting of the flip flop is incorrectly written, a 1 will be present at the inputs of the flip flop 106. This will cause the Q output to change to a 1 and remain in that state. The state of the output of the JK flip flop is shown in FIG. 3u. If the first symbol had a error, the flip flop will have a high output at the occurrence of RER NOT at symbol position 0 of the second symbol as indicated by the dashed lines in the Figure.

In either case, the output of flip flop 106 is provided to a count input of counter 109. Counter 109 initialized to a predetermined count by inputs DET0 to DET3. The count can be varied to tolerate a certain level of errors. A clock input decrements the counter 109. At a count of 0, counter 108 outputs on the TC output an error status indicating that the error tolerance has been exceeded.

The reason that the flip flop 106 indicates the presence of an error in either of two symbols is because each symbol of a TOON code encodes 4 binary bits of data. Thus two symbols encode 8 bits of data. The preferred optical coding system operates on bytes of 8 bits.

The above apparatus was described in conjunction with a TOON code. Other codes having a null in the frequency spectrum are compatible with a prerecorded clock. One such code is a so-called 4/15 code in which there are 4 holes, two each in the even positions and two each in the odd position. One position is left empty at the boundary. With this code, means must be provided to detect the highest signal for both the even and the odd positions, and the second highest. To do this, one merely has to have three sample and holds instead of two, as well as three comparators. One sample and hold would hold the highest value, the second would hold the next highest and the third would hold the new sample to be compared with the other two. The results of the comparison would indicate whether we had a new highest or a new second highest value. These results would be latched and fed back through to the Timing Chip, as well as to the write verify registers, the number of which would continue to correspond to the number of latched comparators. The method of the preferred embodiment is intended to be general with respect to the class of codes having a null in the frequency spectrum at the frequency of the prerecorded clock.

Figure 6:
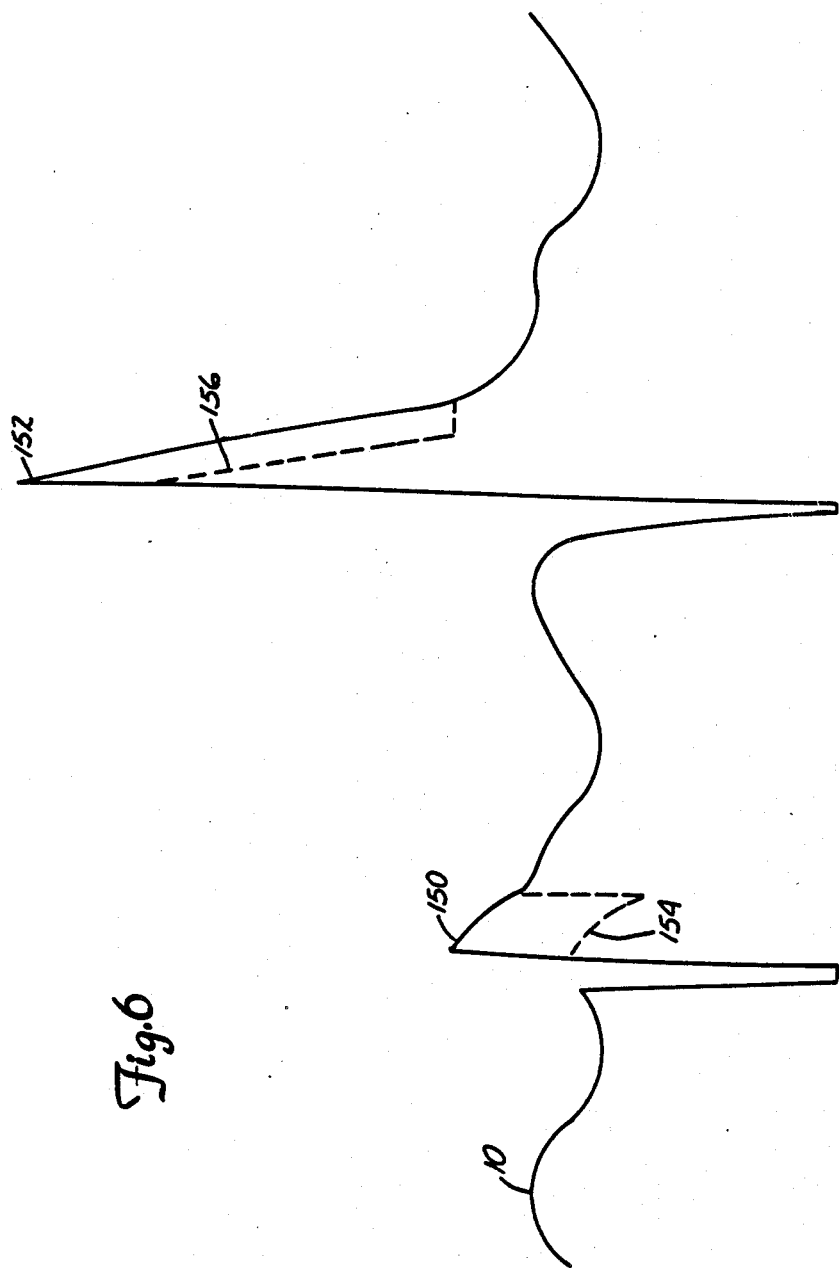
FIG. 6 shows a graph of the offset during a typical read of a pip.

An amorphous pip occurs when the recording medium is not burned, but only transformed into its amorphous state. The amorphous area has less reflectivity than the medium in its crystalline state, but the reflectivity is still greater than that of a hole. FIG. 6 compares a read signal from an amorphous pip with that of a conventional pip due to a hole. The first pip 150 in the figure is that of the amorphous pip. The second is that of the conventional pip 152. It can be seen that the amorphous pip is about one-fifth as strong as a conventional pip, but it is still stronger than the signal from the prerecorded clock 10. A system using differential detection where the signal form the symbol positions is compared to a reference which is the signal of the prerecorded clock, will recognize the amorphous pip as a new higher signal. Further, as amorphous pip occurs at a location where it should be, that is, at a location at which the write pulse attempted to write a hole, the write verify apparatus will incorrectly recognize that a true hole was written.

A solution to this problem lies in providing an offset voltage on the Read 2 signal in response to a write pulse. The offset is the same magnitude as an amorphous pip, but opposite in polarity. With the offset injected into the Read 2 signal, both the amorphous pip and a conventional pip will appear as the dotted lines 154 and 156 in FIG. 6 respectively. It can be seen that the peak voltage of the amorphous pip does not rise above that of the prerecorded clock, and thus will not cause the write verify system to recognize it as a hole. However, the conventional pip 156, which is five times as strong as the amorphous pip to begin with, remains much stronger than the signal of the prerecorded clock 10, and will continue to be recognized as hole by the write verify system.

In the preferred embodiment, the offset is provided by offset means 108 responsive to a write pulse delayed by delay 107, FIG. 1, which causes the AGC and Read Amplifier 110 to offset the Read 2 pulse by the predetermine amount heretofore discussed. The delay 107 delays the offset until after the write pulse on the media has been turned off. The offset means 108 maintains the offset for a fixed period of time, sufficient to permit the write very apparatus 132 to complete the sampling of the pip. The actual circuitry for performing this function is not a part of the present invention, and any circuitry within the skill of those skilled in the art which performs the offset function is contemplated The enumeration of the elements of the preferred embodiment are not to be taken as a limitation on the scope of the appended claims, in which we claim:

What is claimed is:

1. In an optical recording system including optical means for writing information on an optical recording medium, an improvement for affecting an amorphous pip representative of a portion of an optical recording medium that is in an amorphous state, comprising:

first means for receiving a read signal representative of information provided on the optical recording medium, said read signal including a first portion representative of an unchanged portion of the optical recording medium and a second portion having a pip representative of at least one of the following: a hole and an amorphous portion of the optical recording medium; and second means communicating with said first means for inputting an offset signal to said first means, said offset signal being representative o: a pip produced by an amorphous portion of the optical recording medium;

wherein said first means includes means, using said offset signal, for affecting said second portion of said read signal and not other portions of said read signal, in order to prevent said second portion from being detected as a pip due to a hole when it is a pip due to an amorphous portion.

2. A method for affecting, in a reflectance signal from an optical recording medium, an amorphous pip representative of the reflection produced by a portion of an optical recording medium that is in an amorphous state, the method comprising:

obtaining a first signal having a pip, said first signal being related to the reflectance of the optical recording medium and said pip indicating a change in the reflectance of at least a portion of the optical recording medium;

providing a second signal having a magnitude about equal to the magnitude of said pip when said pip relates to a change in reflectance from a portion of the optical recording medium which is in an amorphous state; and subtracting said second signal from at least a first portion of said first signal, and discontinuing said subtracting during at least a second portion of said first signal, to provide a third signal in which a pip due to a hole has a greater magnitude than a pip due to a portion of the optical recording medium being in said amorphous state.

3. In an optical recording system including optical mean for writing information on an optical recording medium, an improvement for affecting an amorphous pip representative of a portion of an optical recording medium that is in an amorphous state, comprising:

first means for receiving a read signal representative of information provided on the optical recording medium, said read signal including an amorphous pip representative of a portion of the optical recording medium which is in an amorphous state, said amorphous pip having a different magnitude than a pip due to a hole; and second means, communicating with said first means, for inputting an offset signal to said first means, said offset signal being representative of an amorphous pip;

wherein said first means includes means for generating a resultant signal using said read signal and said offset signal, said means for generating including means for taking the difference between the amplitude of said amorphous pip in said read signal and the amplitude of said offset signal to change said amorphous pip in said resultant signal, wherein said amorphous pip in said resultant signal is prevented from subsequently being detected as a pip due to a hole.

4. The improvement, as claimed in 3, wherein: the amplitude of said amorphous pip substantially corresponds to the amplitude of said offset signal.

5. The improvement, as claimed in claim 3, wherein: said resultant signal is obtained substantially immediately after the optical means for writing has provided the amorphous state on the optical recording medium.

6. The improvement, as claimed in claim 3, wherein: said first means includes read signal automatic gain control and amplifier means electrically connected to said second means, for outputting said resultant signal in the form of an output voltage.

* * * * *